Sept. 2, 1924.  
W. R. HILLYER  
1,506,905  
TRACTION ATTACHMENT FOR VEHICLE WHEELS  
Filed Feb. 12, 1924

INVENTOR  
*William R. Hillyer*  
BY  
ATTORNEY

Patented Sept. 2, 1924.

1,506,905

UNITED STATES PATENT OFFICE.

WILLIAM R. HILLYER, OF PORT RICHMOND, NEW YORK.

TRACTION ATTACHMENT FOR VEHICLE WHEELS.

Application filed February 12, 1924. Serial No. 692,213.

*To all whom it may concern:*

Be it known that I, WILLIAM R. HILLYER, a citizen of the United States of America, residing at Port Richmond, Richmond County, State of New York, have invented certain new and useful Improvements in Traction Attachments for Vehicle Wheels, of which the following is a specification.

This invention relates to traction attachments for vehicles, and in particular to a type which may be quickly applied and detached.

A particular object of the invention is to provide a traction shoe or link which may be used in combination with the usual form of anti skid chain and which will greatly increase the bearing surface of the vehicle wheel.

A further object is to provide a traction shoe which can be made of few parts and being similar may be produced in quantities, at a minimum cost.

A further object is to provide a traction attachment which may be applied at any time and which after having been used can be quickly detached and stored in the vehicle.

Figure 1:
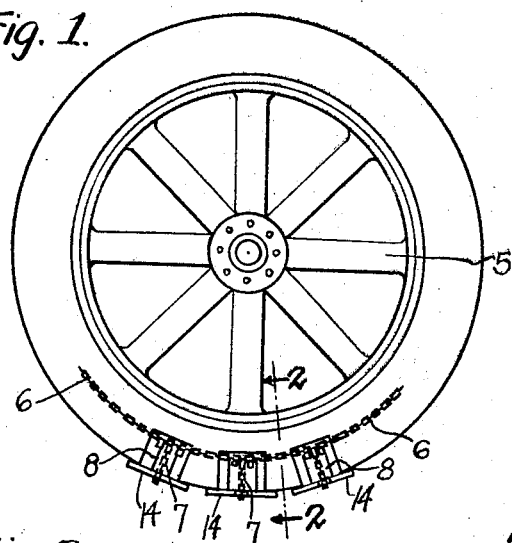
Figure 2:
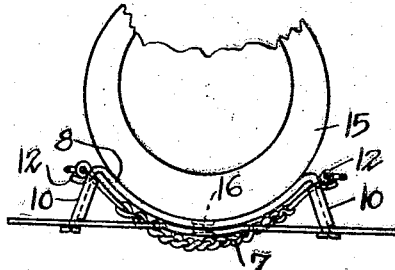
Figure 3:
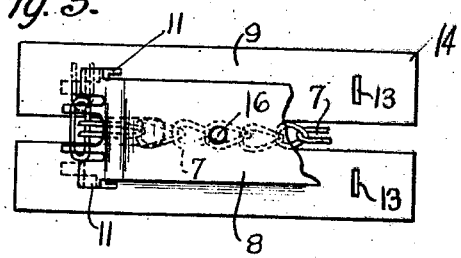
Figure 4:
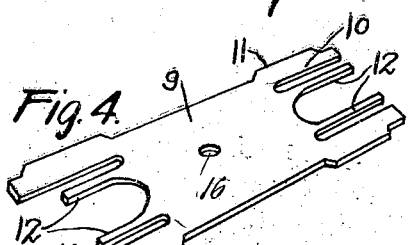
Figure 5:
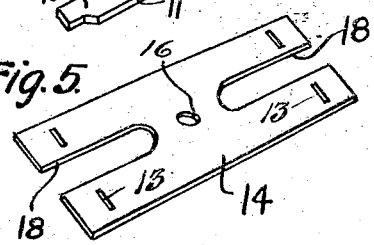
Figure 6:
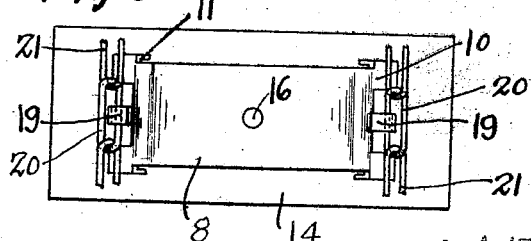
Figure 7:
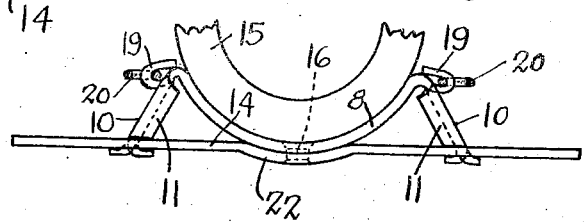

Referring to the drawing wherein I have shown a preferred embodiment of my invention, Fig. 1 is a face view of a vehicle wheel showing my improved traction shoes or plates attached thereto in position for use, there being only three shown to facilitate drawing, Fig. 2 is an enlarged section taken on the line 2—2 of Fig. 1, Fig. 3 is a top plan view of a traction shoe made in accordance with my invention, the saddle portion thereof being broken away to expose the ground engaging plate, Fig. 4 is a view in perspective of the saddle forming a part of my traction shoe as it would appear before being bent to shape, Fig. 5 is a view in perspective of one form of a ground engaging plate, Fig. 6 is a top plan view of a modified form of shoe, in this instance the use of transverse links being dispensed with, Fig. 7 is a view similar to Fig. 2 showing an edge view of the modification as illustrated in Fig. 6.

Referring to the drawing in detail 5 indicates a vehicle wheel around the periphery of which is fastened my traction attachment, the same being held on the wheel through the medium of the usual anti-skid chain 6. The traction shoes which are alike are made up of a ground engaging plate 14, see Figs. 2, 3, 4 and 5, and a saddle member 8, the latter being bent out of a flat piece of material 9, the ends of which are cut to form obliquely disposed struts 10 having overlapping flanged edges 11, which are bent at right angles to said struts to brace the same. These edges also add to the compressive strength of the strut. These struts are disposed at substantially the corners of the saddle and there is formed therebetween projecting supports 12 used for a purpose to be later described; the lower ends of the struts 10 are passed through openings 13 formed in the ground engaging plate 14 and on the underside of the plate are bent in opposite directions against the surface of the plate to securely hold the saddle thereto. When the saddle has been bent to form so that its center portion is cupped to fit the contour of the pneumatic tire 15, the same may be riveted as at 16 to the ground engaging plate 14. Each of these saddles and ground engaging plates when so made up form a shoe and compose one of the elements of the traction attachment. These shoes are spaced around the periphery of the wheel or tire and prevent the same from sinking in soft ground. In fastening the traction shoes to the wheel, I may use a form of anti skid chain 6 which consists of two peripheral chains connected at intervals by transverse chains 7. I place each of the shoes on the chain in such a position that the cross chains pass up through the cut out portions 18 in the ground engaging plate and between the projections 12 of the saddle. This position of the cross chains will allow the peripherally extending chain link to which the cross chain is attached to rest on the projections 12 of the saddle on each side thereof, so that when a row of shoes are laid down and connected to the chain as described, the first shoe may be secured to the wheel in any suitable manner and the wheel revolved until the ends of the chain may be linked to form a peripheral covering of plates for the wheel.

It will be noted that this arrangement not only provides greater tractive surface for the wheel, but the cross chains still function as anti-skid members.

In Figs. 6 and 7 I have shown a method of forming the saddle whereby the use of two ordinary side chains is possible, this being accomplished by having a single projection 19 instead of the two projections 12 above referred to which may be bent to form a loop around the link 20 in a peripheral chain 21. This arrangement fixedly connects the plates.

It will be noted that the ground engaging plate may be curved outward as at 22 to form a seat for the saddle, which will eliminate any tendency of the same to revolve about the rivet.

Thus I have provided a traction attachment for a vehicle wheel which may be made of relatively light material and which will be strong and at the same time provide enough tractive surface to keep the wheels from sinking in sand, soft ground or the like.

Having described my invention, what I claim is—

1. A traction attachment for vehicle wheels comprising, spaced apart ground engaging plates, saddle portions on said plates having obliquely disposed strut portions and adapted to form a seat for the vehicle wheel, a chain adapted to pass peripherally around said wheel, and means on said saddle portions whereby the chain may be releasably attached to the same.

2. A traction element for vehicle wheels comprising a ground engaging plate, a saddle member secured to said plate having obliquely disposed strut portions, and chain supporting extensions intermediate said strut portions.

3. A traction element for vehicle wheels comprising a ground engaging plate, a saddle member on said plate having a portion thereof shaped to fit the vehicle tire, obliquely disposed strut portions at the sides of said saddle member and formed integrally therewith, and chain engaging portions formed in the sides of said saddle member between said strut portions.

4. A traction element for vehicle wheels comprising a ground engaging plate, a saddle member secured to the plate having obliquely disposed flanged strut portions, and chain engaging extensions intermediate said strut portions.

WILLIAM R. HILLYER.